G. N. HINCHMAN.
FEEDING MECHANISM FOR CONVEYERS.
APPLICATION FILED APR. 28, 1919.
1,384,193.
Patented July 12, 1921.
2 SHEETS—SHEET 2.
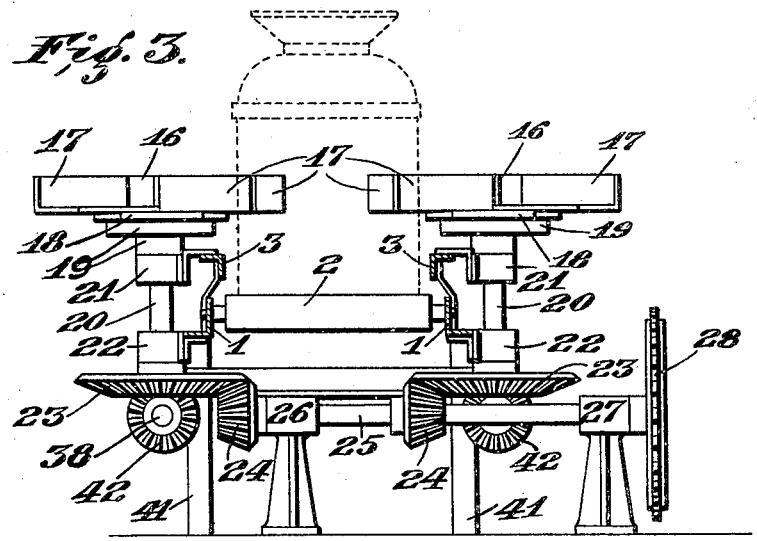
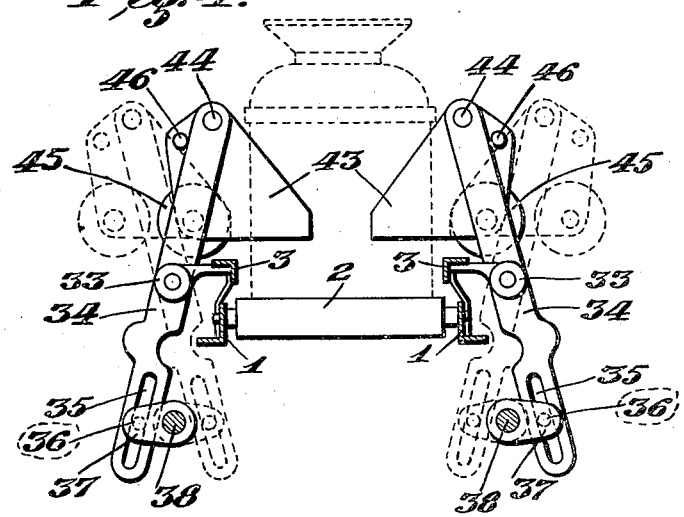
Inventor:
George N. Hinchman,
By Carr & Carr,
his Attys.

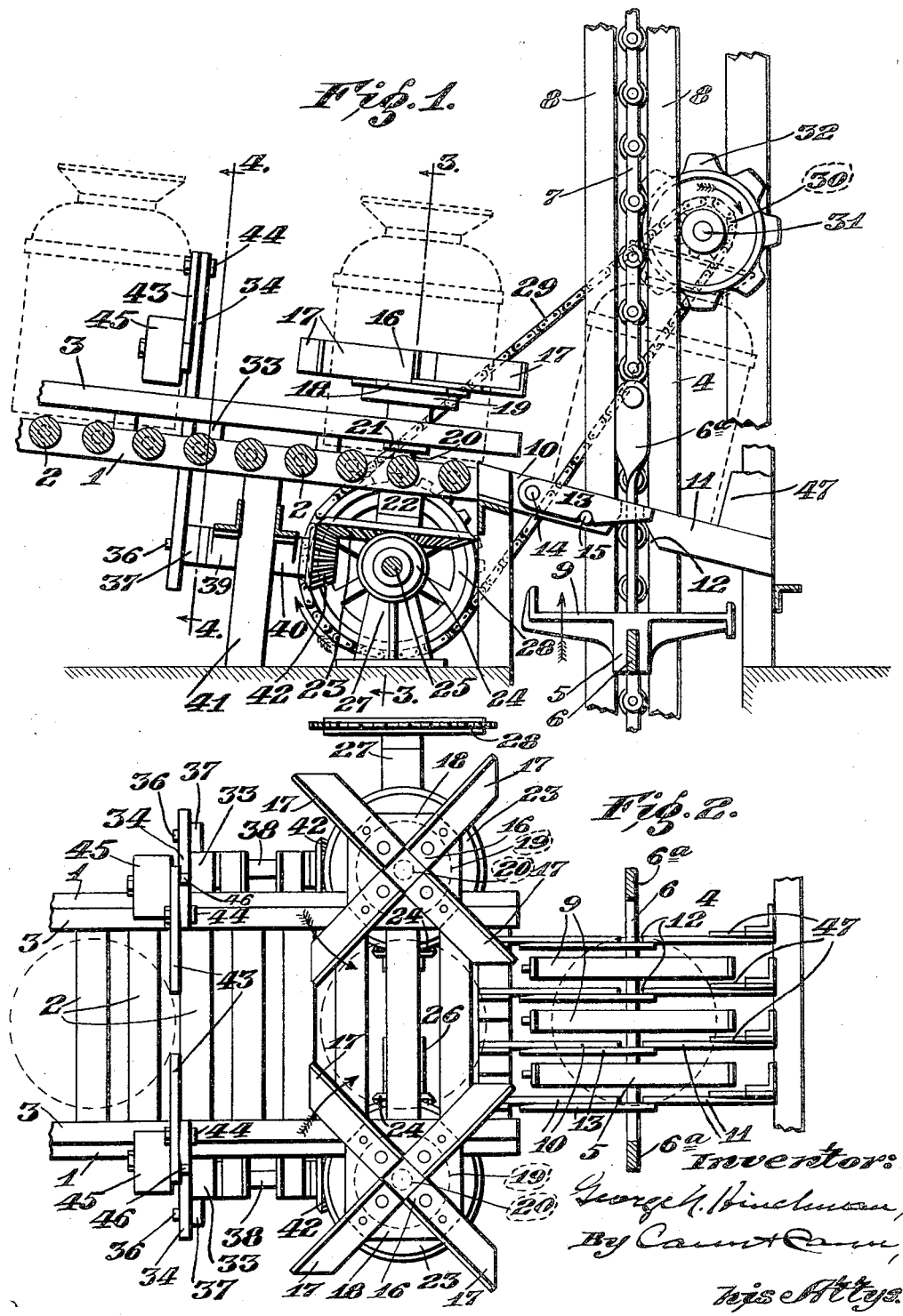

UNITED STATES PATENT OFFICE.

GEORGE N. HINCHMAN, OF WEBSTER GROVES, MISSOURI, ASSIGNOR TO ALVEY MANUFACTURING COMPANY, OF ST. LOUIS, MISSOURI, A CORPORATION OF MISSOURI.

FEEDING MECHANISM FOR CONVEYERS.

1,384,193.  Specification of Letters Patent.  Patented July 12, 1921.

Application filed April 28, 1919. Serial No. 293,173.

*To all whom it may concern:*

Be it known that I, GEORGE N. HINCHMAN, a citizen of the United States, and a resident of Webster Groves, St. Louis county, Missouri, have invented a new and useful Improvement in Feeding Mechanism for Conveyers, of which the following is a specification.

This invention relates to automatic package conveyers, and more particularly to mechanism for transferring the packages from a transverse conveyer or runway to an elevator.

It has for one of its objects to provide for a positive control in the transfer of the packages from the transverse conveyer or runway to the elevator. A further object is to so correlate the transferring mechanism to the elevator mechanism that the former delivers a given number of packages to the carriers of the latter as they come successively into receiving relation to the runway. A still further object is to hold the line of packages in check on the runway behind the feeding device so as to avoid crowding and jamming. Other objects and advantages to be attained will more fully appear in the following description.

In general, the invention consists in an automatically acting stop device against which the packages on the runway are successively brought to rest momentarily or checked in transit, and a feeding device arranged to receive the packages in succession, as they are released from said stop device, so as to push them onto a support to be there taken up by the elevator carriers moving in timed relation to said feeding mechanism. The invention further consists in the parts and in the combinations and arrangements of parts hereinafter described and set forth in the appended claims.

In the accompanying drawings illustrating a practical embodiment of the invention,—

Figure 1 is a fragmentary view, partly in elevation and partly in vertical longitudinal section, showing the coöperative relation of the runway and elevator and the driving mechanism for the stop and feeding devices;

Fig. 2 is a fragmentary plan view;

Fig. 3 is a view partly in end elevation and partly in vertical cross section on or about the line 3—3 of Fig. 1; and Fig. 4 is a similar view on or about the line 4—4 of Fig. 1.

Referring now to the drawings, the numeral 1 designates the side rails of an inclined runway or transverse conveyer, having rollers 2 journaled thereon in relatively close relation to each other and over which the packages ride between guide rails 3 to the elevator 4.

The elevator, of which only a fragmentary portion is shown is of the usual endless chain type. It includes the carriers 5 comprising the yoke 6 which is swung from its ends 6ª on the sprocket chains 7 passing between the vertical guides 8, and parallel members 9 which are disposed horizontally in spaced relation to each other on the middle portion of the yoke so as to pass between inclined supporting bars 10, 11 onto which the package is delivered to be taken up by said carriers 5.

The bars 10, 11 are suitably supported in alinement and in coöperative relation to the end of the runway and have their meeting end portions spaced apart, as at 12, to allow the yoke 6 to pass between them. Supplemental plates 13 are hinged on the sides of the plates 10, as at 14, so as to span the gap 12 and overlap the plates 11, and being normally supported, as at 15, flush with the upper edges of said plates 10 and 11 to preserve the continuity thereof when the package is moved slidably thereon as will be later described, but being liftable when the yoke 6 moves upward in engagement therewith.

On opposite sides of the runway, adjacent to the discharge end thereof, are two rotatable feeding devices or star wheels 16 comprising four radial arms 17 which are mounted on plates 18 that are in turn mounted on hub members 19 fixed on upstanding shafts 20. The shafts 20 are journaled in bearings 21, 22, mounted respectively on the guide rails 3 and roller-supporting rails 1, and they are provided at their lower ends with beveled gears 23.

Meshing with the gears 23, at the inner sides thereof, are pinions 24 which are fixed on a transverse horizontal shaft 25 so as to drive the gears 23 in opposite directions. This shaft 25 is journaled in bearings 26, 27, and it has a sprocket wheel 28 thereon which is driven by a chain 29 passing over a sprocket wheel 30 on a shaft 31 on which is a second sprocket wheel 32 in engagement with the elevator chain 7 to be thereby rotated.

The ratio of the gearing thus far described is such that the shafts 20 make one-quarter of a revolution each time an elevator carrier is brought into receiving position with respect to the end of the runway and in taking the package from the supporting bars 10, 11.

Pivotally mounted on bearing brackets 33 extending outward from the rails 3, are rocker-bars 34 whose lower end portions are slotted, as at 35, to receive crank-pins 36 on crank-arms 37 which are fixed on shafts 38 extending at right angles to the shaft 25. These shafts 38 are journaled in bearings 39, 40, on the supports 41 of the runway and they have pinions 42 thereon which mesh with said gears 23 and are of the ratio of four to one, or, in other words, so that said shafts 38 make four revolutions to one revolution of the shafts 20.

On the upper ends of the rocker-bars 34 are dogs or pivotal stop members 43 which are carried intermittently into the path of the line of packages on the runway each time said rocker-bars are oscillated. These dogs, as shown, comprise plates or angular members which are hinged, as at 44, and rather loosely, so as to swing freely and also be permitted slight canting movement on their pivot studs; and they are provided with weights 45 which tend to keep them balanced in their normal hanging position throughout the oscillatory movement of the rocker-bars 34.

When the upper ends of the rocker-bars 34 are moved inward the plates 43 overhang the runway considerably, as shown in Figs. 2 and 4, so as to afford a substantial abutment or stop for the packages; and should the pressure of the packages against them be so great as to cause them to hang as the rocker-bars 34 move outward, lugs or studs 46 are provided on said plates adjacent to the outer edges of said rocker-bars to be engaged thereby and effect the forcible withdrawal of said plates.

In the drawings the conveyer is shown as used for the conveyance of milk-cans or like articles or objects. In operation a line of the cans is sent down the runway by gravity. The elevator being constantly in motion under power, the chain 7 thereof drives the sprocket wheel 32 which in turn drives the sprocket wheel 30 which is fixed on the same shaft therewith. The sprocket wheel 28 is accordingly driven in the same direction by the chain connection 29 with said sprocket wheel 30, and, of course, the shaft 25 is thereby rotated, and, through the medium of the pinions 24 thereon, the gears 23 are correspondingly rotated and through them the shafts 20 carrying the feeder or star wheels 16. The latter are so timed with respect to the actuation of the dogs 43 that, when said dogs are in overhanging relation to the runway, the arms 17 of said feeder or star wheels 16 are disposed diagonally at angles of forty-five degrees and just about to move into position to receive a can and at the same time discharge one which would be in the position shown by the dotted circle between them, it being understood, of course, that the said dogs move in and out during each quarter revolution of said feeder or star wheels.

As the can is pushed forward onto the inclined supporting bars 10, 11, it slides down the latter until arrested by suitable stop members 47, and just before the elevator carrier 5 reaches said bars 10, 11. Then, as the carrier moves up between said bars, it takes up the can therefrom, the can righting itself on the carrier as the latter moves in engagement therewith.

The loose mounting of the dogs or stop members 43 on their pivot studs affords a sort of cushion in case a can moves down the runway with considerable momentum, because they are capable of canting slightly forward and thereby check the speed of the can and even stop it before it strikes the ends of the arms 17 of the feeder wheels 16.

While the feeder wheels 16 are shown as having four arms, obviously a greater or lesser number may be provided and the timing of the operation thereof with respect to the elevator carriers and the dogs or stop members varied accordingly. So, too, the entire structure admits of considerable alteration and modification without in the least departing from the spirit of the invention as defined by the appended claims. Therefore, it is not limited to that shown in the drawings.

What I claim is:

1. In a package conveyer, a vertically traveling conveyer having carriers thereon, a stationary way communicating therewith, a pair of oppositely disposed rotating feeders located one on each side of said way near the discharge end thereof and operating in timed relation to the carriers of said traveling conveyer, and a pair of oppositely disposed stops located one on each side of said way adjacent to said feeders and operatively connected therewith to be actuated thereby crosswise of said way, said pair of stops operating in timed relation to said pair of feeders and adapted to be moved toward each other into the path of the line of packages on said way prior to their engagement by said feeders, said pair of stops being adapted to be moved away from each other out of the line of packages on said way to permit a package to be engaged by said pair of feeders while said feeders are delivering a package to said traveling conveyer.

2. In a package conveyer, a traveling conveyer and a stationary way communicating therewith, opposed coöperating rotating feeders located on opposite sides of said way at the discharge end thereof and having correlated arms to engage the packages on said way in succession to mechanically deliver them to said traveling conveyer, and a stop device for each of said rotating feeders operating in timed relation therewith, said stop devices being adapted to engage the respective packages on said way prior to their engagement by said rotating feeders.

3. In a package conveyer, a traveling conveyer and a stationary way communicating therewith, rotating feeder devices on opposite sides of said way near the discharge end thereof and having radial arms, the arms of the one device moving in definite correlation to those of the other device whereby to engage in succession the packages of a line thereof on said way and deliver them to said traveling conveyer, and opposed oscillatory stop devices on opposite sides of said way to engage the respective packages in succession immediately prior to the engagement therewith of said feeder devices.

4. In a package conveyer, an inclined runway, an elevator at the discharge end thereof, said elevator including a series of spaced carriers, rotating feeder devices on opposite sides of said runway near the discharge end thereof and having regularly spaced arms moving over said runway in coöperative relation whereby to engage a package thereon equally at opposite sides to deliver it to said elevator, stop devices on opposite sides of said runway inward from said feeder devices, the same including rocker bars oscillating transversely with respect to the runway, dogs hinged on said rocker bars to hang in balanced suspension and being capable of overhanging said runway in the path of the packages thereon when said rocker bars are disposed toward the runway, and means for positively actuating said feeder devices and said rocker bars in timed relation to each other and to movement of the carriers of said elevator.

5. In a loading mechanism for traveling conveyers, a stationary way and a traveling conveyer moving in coöperative relation to the discharge end thereof, a pair of feeder devices on opposite sides of said stationary way near the discharge end thereof, the same including star wheels whose arms move over said way in coöperative relation toward said traveling conveyer, rocker bars on opposite sides of said way inward from said feeder devices and oscillating transversely with respect to said way, stop members mounted on said rocker bars in hinged suspension and having inward portions to overhang said way when said bars are disposed toward the way, and means for positively driving said feeder devices and said rocker bars in timed relation to each other and to said traveling conveyer.

Signed at St. Louis, Missouri, this 25 day of April, 1919.

GEORGE N. HINCHMAN.